United States Patent [19]
Ettinger et al.

[11] 3,854,027
[45] Dec. 10, 1974

[54] PERCUSSIVE STUD WELDING SYSTEM

[75] Inventors: Donald H. Ettinger, Royal Oak; Nicholas G. Zorka, Sterling Hts., both of Mich.

[73] Assignee: USM Corporation, Boston, Mass.

[22] Filed: Sept. 13, 1972

[21] Appl. No.: 288,743

[52] U.S. Cl. ............................................. 219/98
[51] Int. Cl. ........................................... B23k 9/20
[58] Field of Search .............................. 219/98, 99

[56] References Cited
UNITED STATES PATENTS

| | | | |
|---|---|---|---|
| 2,847,557 | 8/1958 | English | 219/98 |
| 3,597,572 | 8/1971 | Ettlinger et al. | 219/98 |
| 3,696,227 | 10/1972 | Wenrich | 219/98 X |
| 3,758,743 | 9/1973 | Lake | 219/98 |

Primary Examiner—J. V. Truhe
Assistant Examiner—Hugh D. Jaeger
Attorney, Agent, or Firm—Burton & Parker

[57] ABSTRACT

A percussive stud welding system including a stud feeder for feeding studs successively to a welding tool of the percussive type, the tool having a reciprocable plunger operable to deliver studs received from the feeder to a welding position and retain each stud thereat during the actual welding operation. The welding tool is provided with means for releasably locking the plunger in its stud retaining position against relative movement with respect to the remainder of the tool as the stud is shifted toward and against the workpiece to be welded in the percussive mode.

10 Claims, 11 Drawing Figures

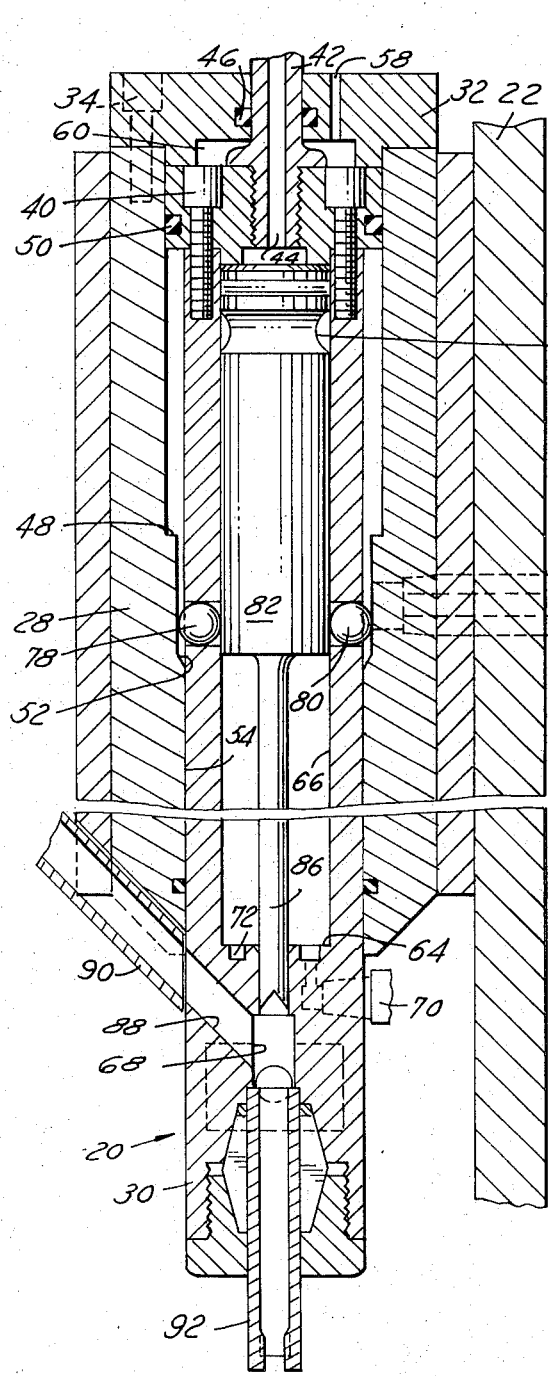
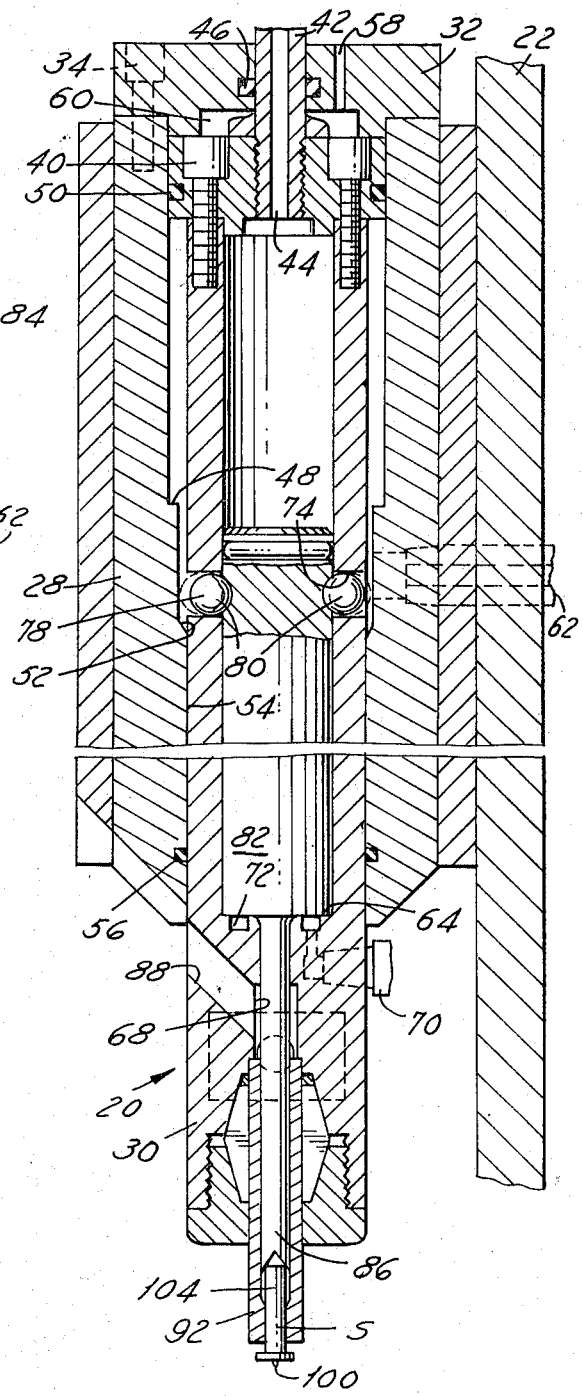
FIG.1
FIG.2

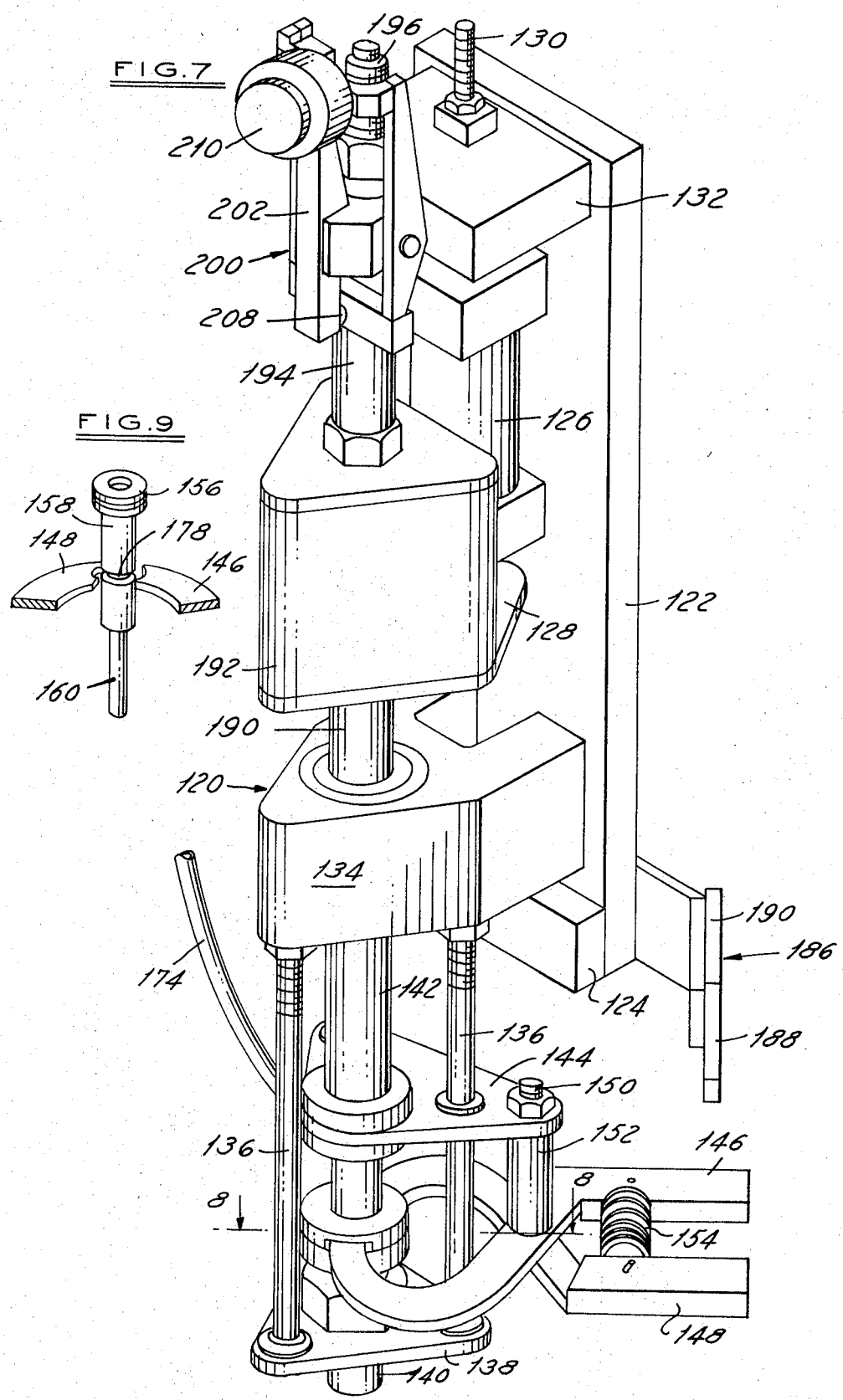

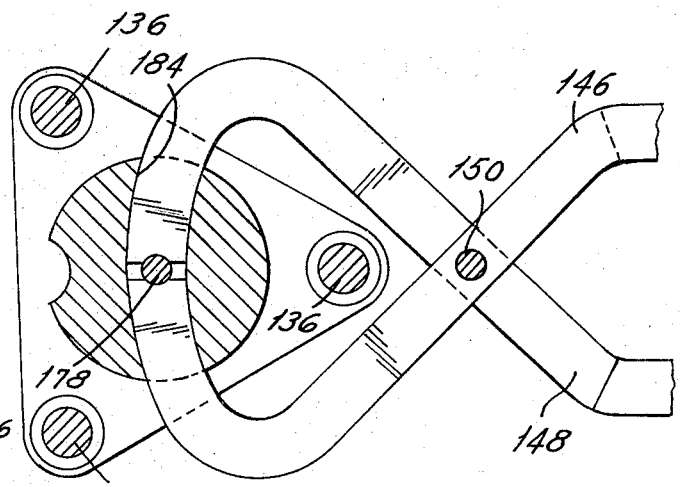
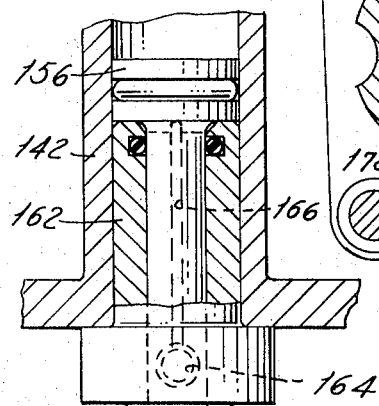
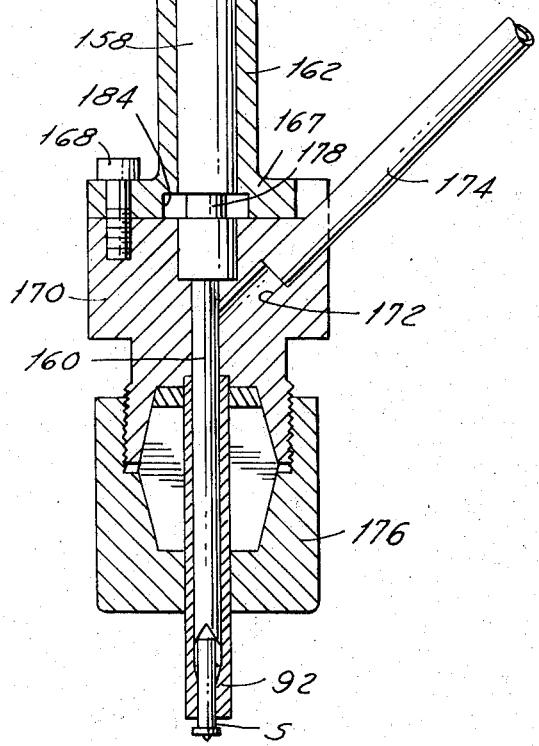

PERCUSSIVE STUD WELDING SYSTEM

BACKGROUND OF THE INVENTION

1. Field of the Invention

This invention pertains generally to the field of welding, and more particularly to the welding of studs to workpieces or structural members by the percussive method, wherein the stud is shifted toward the workpiece and forcibly plunged into contact therewith while current is applied to effect the weld, a small disintegratable tip being provided on the stud to assist in forming a proper weld.

2. Description of the Prior Art

In the art of percussive stud welding the stud is forcibly shifted against the workpiece to form the weld, either by gravity or by some external motive force. A small projecting tip on the welding end of the stud disintegrates upon impact with the workpiece, and the stud continues its travel until its welding end abuts the workpiece surface to complete the weld. During tip disintegration, the workpiece surface and the stud end are softened or melted sufficiently to achieve a proper weld upon contact.

During the actual welding operation, disintegration of the stud tip and forcible stud to workpiece contact create considerable dynamic energy with resultant forces tending to cause the stud to rebound from the workpiece, thereby materially adversely affecting the quality of the weld. This so called rebounding effect was not a serious problem where the studs were manually loaded into the welding tool collet, because the tool was constructed without moving internal parts, and thus could be of whatever weight was required to provide sufficient inertia to prevent rebounding.

However, with the advent of automatically fed stud welding equipment, a stud delivery passage is provided in the welding tool coupled to the stud feeder, and a shiftable plunger is disposed within the passage to transfer the stud therethrough and into welding position. The plunger also serves to back up the stud during the actual welding operation. As the stud is forcibly projected against the workpiece to weld the stud, the rebound effect above described tends to drive the stud and plunger away from the workpiece. One obvious solution to this problem is to make the plunger of such a mass that it possesses sufficient inertia to more than offset the rebounding force. However, this results in a relatively large, massive welding tool which is expensive to manufacture, cumbersome and unwieldly.

Applicants have found an appreciably more efficient and less costly solution to this rebounding problem, namely to provide means for locking the plunger, and thus the stud, against relative movement with respect to the remaining portions of the welding tool as the tool travels toward the workpiece to effect a weld, said means being releasable to permit relative plunger movement after completion of a weld so that the next stud may be transferred to welding position. As will be seen, the stud may be moved toward the workpiece by gravity or by a power source such as a reciprocable motor, and applicants have provided plunger locking means for both of these systems.

SUMMARY

A stud welding system of the percussive type having a stud feeder for automatically delivering successive studs to a welding tool, said tool including a body having a stud holding collet at one end for holding a stud in welding position and a stud transfer passage establishing communication between the feeder and the collet, a reciprocable plunger shiftable in the passage to transfer a stud to welding position in the collet and to retain the stud during welding, and locking means coupled to said plunger and operable to lock the plunger against movement with respect to said tool body when in said welding position and releasable to permit plunger transfer movement after the welding operation.

BRIEF DESCRIPTION OF THE DRAWINGS

FIG. 1 is a longitudinal cross section through a fluid pressure operated percussive welding tool embodying the invention showing the tool in retracted position and the stud delivery plunger in retracted position rearwardly of the stud inlet;

FIG. 2 is a view similar to FIG. 1 showing the tool in retracted position and the plunger in its extended position backing up a stud in the tool collet;

FIG. 7 is a perspective view of a gravity operated percussive welding tool embodying the invention and having mechanical locking means for retaining the plunger against relative movement;

FIG. 8 is a cross section taken along line 8–8 of FIG. 7;

FIG. 9 is a perspective view of the plunger showing the relationship thereto of the locking means;

FIG. 10 is a longitudinal section taken through the lower end of the tool showing features of construction.

DESCRIPTION OF THE PREFERRED EMBODIMENTS

Figure 3:
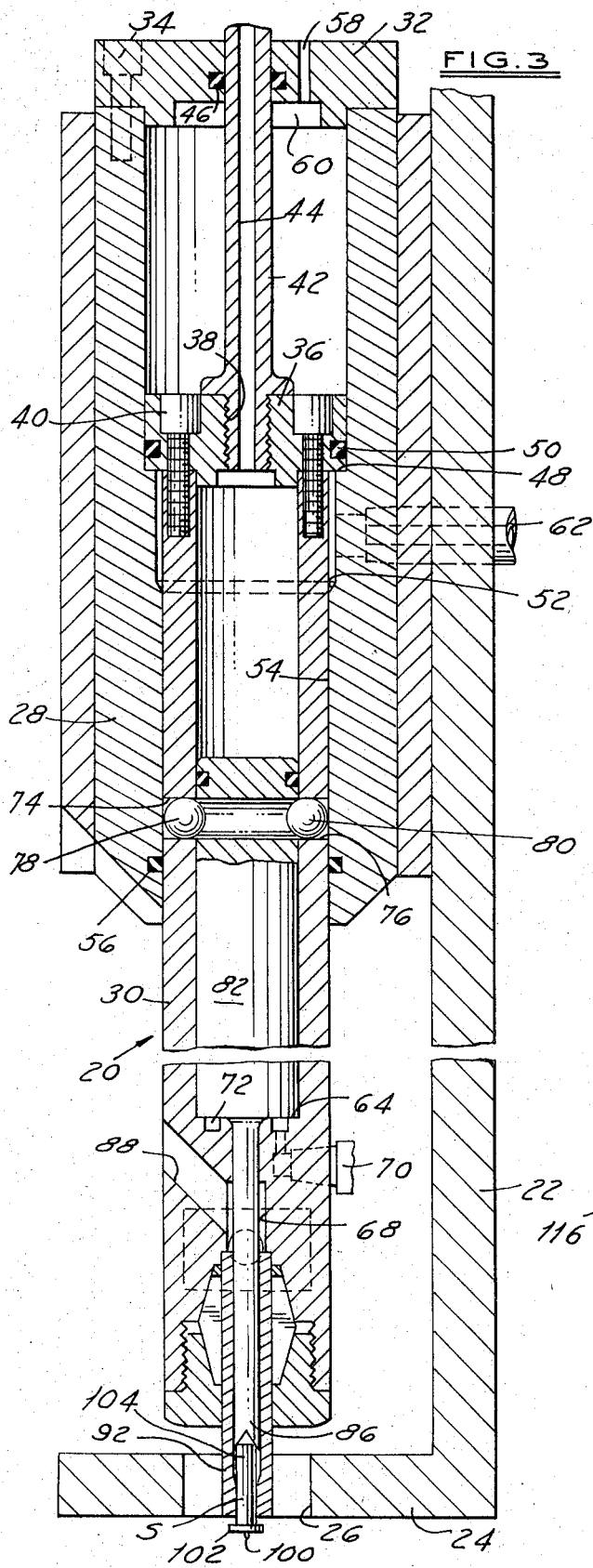
FIG. 3 is a view similar to FIGS. 1 and 2 showing the tool in welding position with a stud in the collet backed up by the plunger.
Figure 4:
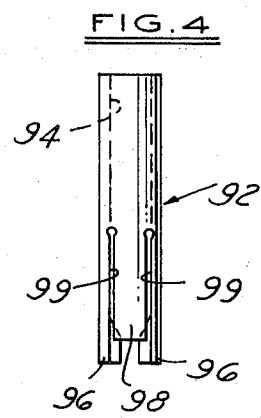
FIG. 4 is a side elevation of the stud collet.
Figure 5:
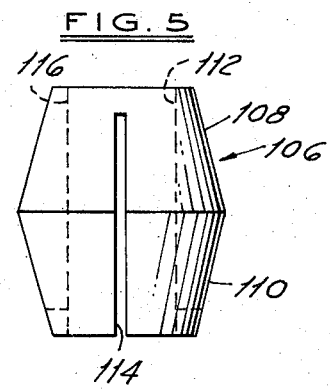
FIG. 5 is a side elevation of the collet retaining nut.
Figure 6:
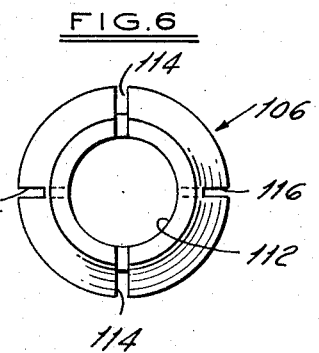
FIG. 6 is an end elevation of the collet retaining nut.

In FIGS. 1–6 there is shown a pneumatically operated percussive welding tool generally indicated at 20 mounted upon an upright support 22 upstanding from a base 24 having an aperture 26 through which the tool collet carrying a stud projects during a welding operation. The tool includes an outer cylinder 28 and an inner cylinder 30, the former being closed at one end by an end wall member 32 secured thereto as by cap screws 34, while the corresponding end of the inner cylinder is closed by an end cap 36 having an internally threaded axial aperture 38 therethrough and secured by cap screws 40. Threaded into aperture 38 and projecting through cap 32 and therebeyond is a pipe 42 defining a fluid passage 44 communicating with inner cylinder 30. An O-ring seal 46 in cap 32 seals around the pipe 42.

Outer cylinder 28 has a stepped bore defined by a radial shoulder 48, with the cap 36 of the inner cylinder 30 fitting the upper end of the bore to define a piston encircled by an O-ring seal 50. Spaced beneath shoulder 48 cylinder 28 has an inwardly tapered shoulder 52 defining a lower cylinder portion 54 within which inner cylinder 30 slidably fits, surrounded by another O-ring seal 56 at the lowermost end of cylinder 28. End cap 32 has an air inlet 58 adapted to be coupled to a source of air under pressure, and a recess 60 in the cap provides an air space above piston-cap 36 when in its retracted position as shown in FIGS. 1 and 2. Cylinder 28 also has a second pressure air inlet 62 spaced between shoulder 48 and taper 52 as shown. End cap 32 and shoulder 48 provide positive stops for piston 36, thus defining the stroke limit of inner cylinder 30 within outer cylinder 28.

Inner cylinder 30 is also provided with a stepped bore as defined by radial shoulder 64 dividing it into a larger upper cylinder portion 66 and a smaller lower cylinder portion 68. Upper cylinder portion 66 is provided with a pressure air inlet 70 which communicates with an annular groove 72 in the cylinder lower end. Intermediate its opposite ends cylinder portion 66 is provided with a plurality, in this case two, radially opening apertures 74 and 76, within which are positioned a pair of balls 78 and 80. Disposed within cylinder 66 is an elongate piston 82 having an arcuate circumferential groove 84 adjacent its upper end, the groove being sized to accommodate the balls 78 and 80 as shown in FIGS. 2 and 3. An elongate plunger or rod 86 sized to reciprocate within cylinder portion 68 is fastened to or made integral with piston 82 and projects axially thereof.

Opening through inner cylinder wall 30 is a stud inlet passage 88 which communicates at its inner end with cylinder portion 68. Spaced slightly from the inlet 88 and axially aligned therewith in the position of FIGS. 1 and 2, is the downstream end of a stud delivery conduit 90, the opposite end of which is coupled to a suitable stud feeder (not shown) of any suitable construction, such as for example a feeder of the general character shown in U.S. Pat. No. 3,582,602. Studs are delivered successively from the feeder through conduit 90, preferably under air pressure, to the inlet 88 in a manner known in the art.

Supported in the tool 20 in communication with the chamber 68 is a collet 92 (FIG. 4) having an axial passage 94 and terminating at its outer end in two pairs of opposed resilient fingers 96 and 98, the ends of the fingers 96 projecting axially beyond the fingers 98. The fingers are separated by narrow longitudinal slits 99 and are sufficiently flexible to permit the stud to pass, yet grippingly engaging the stud when in welding position. The offset finger ends on collet 92 are provided to accommodate the particular stud S shown in FIGS. 2 and 3, such stud having a frangible tip 100, an enlarged head portion 102 and a shank 104. As the longer fingers 96 must flex sufficiently to permit stud head 102 to pass therebetween to attain the position shown in FIGS. 2 and 3, there are provided the shorter fingers 98 which grip the stud shank 104 to prevent the stud from squirting out of the collet during delivery to the welding position.

The collet 92 is held within the tool by a retaining nut 106 (FIGS. 5 and 6), which has symmetrically tapered opposite end portions 108 and 110, and an axial bore 112. The nut also has a pair of opposed longitudinal slots 114 opening through one end thereof and an oppositely disposed pair of identical slots 116 opening through the opposite end. As shown in FIG. 3, for example, the nut 106 seats in a tapered recess 117 in the forward end of the tool 20, and a threaded nut 118 having a similarly tapered surface 119 retains the nut. Upon assembly, the tapered surfaces 117 and 119 compress the retaining nut 106 about the collet 92 to securely retain the collet in the tool.

In the at-rest or retracted position of the welding tool 20 shown in FIG. 1, both pistons 40 and 82 are in their retracted positions, and as the pistons are double acting, ports 62 and 70 are pressurized, while ports 44 and 58 are on exhaust. Upon delivery of a single stud from the feeder through conduit 90 and inlet 88 into chamber 68 forwardly of plunger 86, port 44 is pressurized and port 70 is exhausted to shift piston 82 and plunger 86 to their extended position shown in FIG. 2, thereby transferring the stud S to its welding position in collet 92. As piston 82 shifts, plunger 86 picks up the stud S and transfers it positively to the position shown in FIG. 2. When in its forwardmost position, the piston 82 abuts the end wall of cylinder 66, whereat its groove 84 is positioned in radial alignment with the balls 78 and 80. The device is now ready for the welding cycle to being.

Pressurization of port 58 and exhaust of port 62 provides pressure air against piston 36, shifting connected cylinder 30 downwardly. During the first increment of travel, balls 78 and 80 pass taper 52, urging the balls into the groove 84 in piston 82, thereby locking the piston and plunger 86 against relative movement with respect to cylinder 30. Substantially simultaneously with pressurization of port 58, welding current is supplied to stud S through collet 92, and as the stud strikes the workpiece (not shown) stud tip 100 disintegrates and the stud head 102 is plunged against the workpiece and becomes welded thereto. Because the piston and plunger, 82 and 84, which back up the stud, are locked with respect to the piston cylinder 36, 30 and as the area of piston 36 against which the air pressure acts is comparatively large, the tendency of the stud to rebound as it strikes the workpiece and the tip disintegrates is effectively eliminated.

Figure 11:
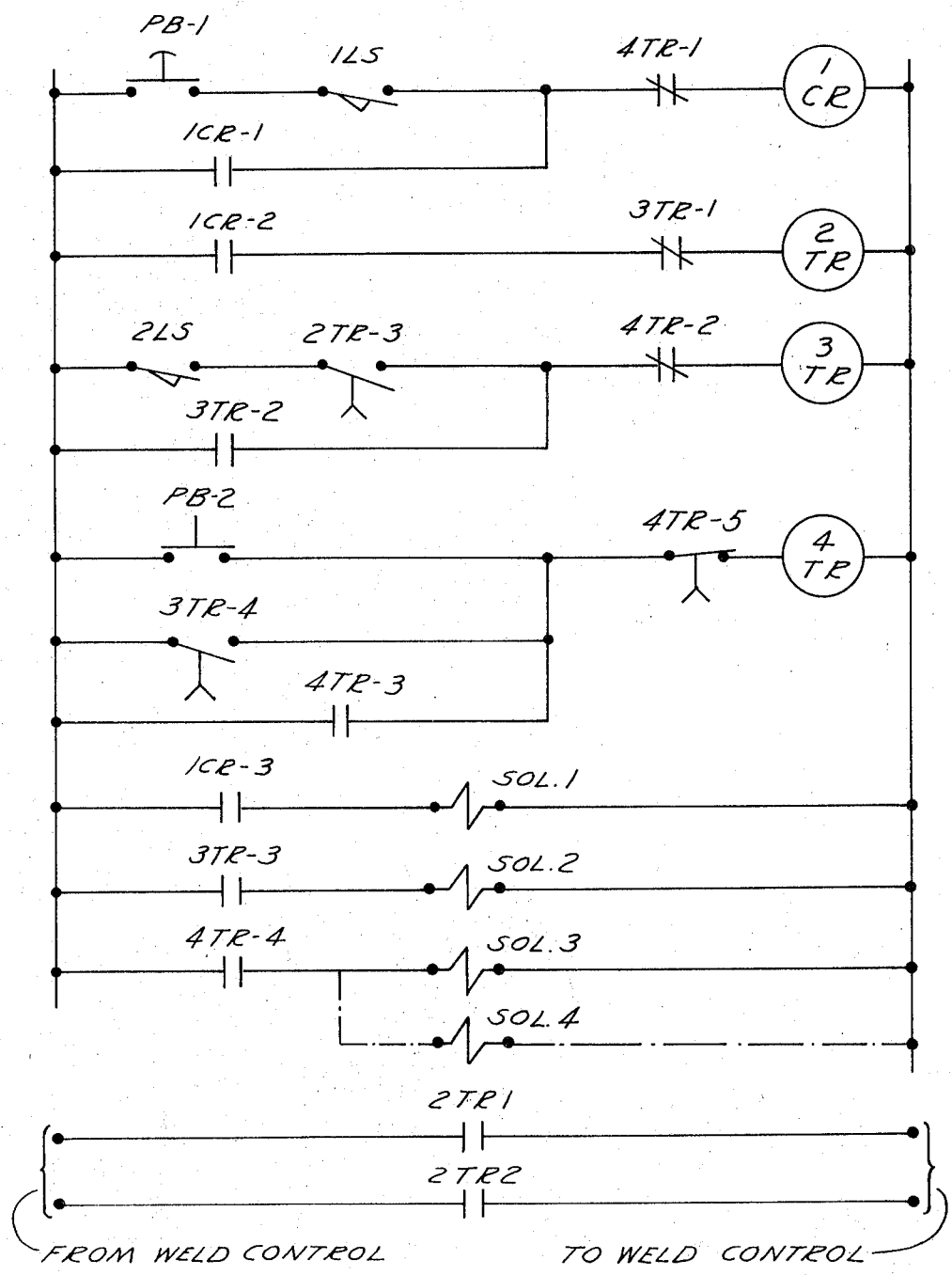
FIG. 11 is a simplified electrical schematic diagram of a suitable control for the tool shown in FIGS. 1–6.

In FIG. 11, there is shown a simplified schematic diagram of an electrical circuit for controlling the operation of the welding tool shown in FIGS. 1–6 inclusive. It should be noted that the supply of fluid under pressure to the tool is controlled by double acting valves which are solenoid operated, energization of the solenoid pressurizing the valve in one direction, while de-energization of the solenoid operates to pressurize the valve in the opposite direction.

Thus, in the normal "at rest" condition of the system, solenoid SOL. 1 will be de-energized, thereby pressurizing its associated valve to pressurize line 70, while soleniod SOL. 2 will likewise be de-energized to pressurize line 62, and the tool will therefore be in its retracted position as shown in FIG. 1. In addition, two limit switches are provided, shown in FIG. 11 at LS1 and LS2 respectively. Both of these switches are normally open, switch LS1 being closed by the return of the piston 36 to its uppermost position, while LS2 is closed by the retraction of piston 82.

Assuming that a stud S has been fed to the welding tool, and is in the passageway defined by collet 92, and the tool is in its up or retracted position as shown in FIG. 1, closure of the pushbutton switch PB1 in FIG. 11 momentarily will cause the control circuit to operate in the following fashion. As LS1 is closed by the cylinder 36 being retracted, closure of PB1 will energize control relay 1CR, closing its associated contacts 1CR-1 to lock the relay in, and 1CR-3 to energize solenoid SOL. 1. Contacts 1CR-2 are also closed to energize time delay relay 2TR, which immediately closes its associated relay contacts 2TR-1 and 2TR-2 to complete the welding circuit.

Energization of SOL. 1 pressurizes line 44 and depressurizes line 70 to shift piston 82 from its position shown in FIG. 1 to its position shown in FIG. 2, thereby seating stud S in the collet 92. At the bottom of its stroke, piston 82 effects the closure of limit switch 2LS, and when the capacitor bank has reached full charge, time delay relay contacts 2TR-3 are closed, energizing relay 3TR.

Energization of 3TR opens contacts 3TR-1 to deenergize relay 2TR and interrupt the capacitor charge circuit, simultaneously closes relay contacts 3TR-2 to lock in relay 3TR, and also closes 3TR-3 to energize solenoid SOL. 2. Upon energization of SOL. 2, line 58 is pressurized and line 62 is exhausted, thereby shifting the pistons 36 and 82 in unison toward the workpiece to effect the weld, i.e., from the position shown in FIG. 2 to the position shown in FIG. 3. When the tool reaches the latter position, the stud S strikes the workpiece, tip 100 is disintegrated and the stud portion 102 is welded to the workpiece as above described.

When the weld is completed, relay 3TR times out, closing its associated contacts 3TR-4 to energize relay 4TR, thereby opening contacts 4TR-1 and 4TR-2 to drop out relays 1CR and 3TR, and at the same time close contacts 4TR-3 to lock in relay 4TR. Simultaneously, relay contacts 4TR-4 are closed energizing solenoid SOL. 3 to operate the feed system (not shown) thereby delivering another stud to the welding tool through the conduit 90 (FIG. 1). After a suitable time interval, relay 4TR times out, and contacts 4TR-5 open and the system is ready to be recycled. Opening of contacts 4TR-1 and 4TR-2 as above described serves to deenergize relays 1CR and 3TR respectively, thereby opening associated contacts 1CR-3 and 3TR-3 to pressurize lines 70 and 62 and return the tool to its retracted position shown in FIG. 1.

It should be noted that switches 1LS and 2LS serve as safety switches to prevent actuation if the tool is not in proper position. Closure of switch 1LS signals that the tool is in its retracted position, and prevents cycle initiation in the event of improper positioning. Switch 2LS, is closed by movement of piston 82 to its position shown in FIG. 2 and signals proper positioning of the stud S within the collet 92 in welding position.

There is further shown in FIG. 11 a second pushbutton switch PB2, which is provided for the purpose of actuating the stud feed control without cycling any other part of the system. This feature may be utilized to load the first stud into the welding tool upon start-up, and also to recycle the stud feed system in the event of malfunction thereof. PB2 is preferably a spring-return push-button switch, and when it is closed and held closed manually, relay 4TR is energized to close relay contacts 4TR-4 and energize solenoid SOL. 3 to actuate the stud feed system and feed a stud through conduit 90 to the collet 92. Relay 4TR is de-energized after feed system cycling by opening the time delay contacts 4TR-5 preventing continued recycling of the feed system even though switch PB2 is held closed.

Referring now to FIGS. 7-10, there is shown a gravity actuated percussive welding tool 120 fixed to a stationary upright support 122, along the lower edge of which is fixed a stop block 124. Adjacent the top of the support 122 there is mounted a vertically disposed reciprocating air motor 126 having a downwardly extending piston rod (not shown) coupled to a projecting arm 128 of the tool 120. A threaded rod 130 projects through a block 132 on support and into the air motor cylinder, whereby axial adjustment of the rod 130 effects variation of the motor piston stroke.

The tool 120 includes a block-like body 134 from which depend three support rods 136 carrying at their lower ends a generally horizontal plate 138, from which a hollow cylindrical spark shield 140 projects downwardly. Secured in the block 134 is a vertically disposed cylinder 142 having a second plate 144 secured thereto, and a pair of locking fingers 146 and 148 are suspended in spaced relation below the plate 144 by a bolt 150 which extends through a spacer sleeve 152, the bolt providing a pivot about which the fingers are swingable. A coil spring 154 is positioned between the locking fingers 146 and 148 and is connected at its opposite ends to the fingers, urging their outer ends toward each other.

Disposed within cylinder 142 is a piston 156 having an integral piston rod defining an upper port 158 and a lower plunger or rod portion 160 (see FIG. 10). Fixed to cylinder 142 is a secondary guide cylinder 162, the upper end of which serves as a stop for piston 156, the member 162 having an air inlet port 164 and vertical air delivery passage 166 communicating with the piston lower face. Secured to the lower flanged end 167 of member 162 as by bolts or the like 168 is a manifold block 170 having a stud inlet passage 172 communicating with a flexible feed conduit 174 coupled at its opposite end to the stud feed mechanism (not shown). The lower end of block 170 is externally threaded to accept a nut member 176 within which a collet 92 identical to that previously described is retained by a tapered retainer also identical to that shown in FIGS. 1-6.

Piston portion 158 is provided with an annular undercut 178, and the inner ends of fingers 146 and 148 are shaped to fit within the undercut, as shown at 180 and 182. The flange portion 167 of member 162 exhibits an arcuate groove 184 corresponding in curvature to the inner ends of the fingers 146 and 148, and the latter are disposed therein as shown most clearly in FIG. 8. In FIG. 7 is shown a cam plate 186 supported on a bar 188 which projects from support 122, the cam plate being vertically aligned with the space between the outer ends of fingers 146 and 148. Cam plate 186 has an inwardly tapered lower end portion 188 and a rectangular upper end portion 190, the tapered portion fitting between the fingers 146 and 148 while the upper portion is of greater horizontal dimension so as to spread the fingers apart against the bias of spring 154 as hereinafter described.

Mounted upon an extension 190 of cylinder 142 is a weight 192, which may be a hollow housing filled with shot or the like, from the lower edge of which projects plate 128. Upstanding from weight 192 is a rod-like extension 194, the upper end of which is threaded as at 196 to accept an adjustment nut 198. A release mechanism generally indicated at 200 is secured to support 122 by block 132, and includes a release lever 202 pivotally mounted on an axis 204 journalled in a clevis 206. The lower end of lever 202 has a laterally projecting latch portion 208 engageable with a projecting shoulder (not shown) on rod 194, while the upper end of lever 202 has a palm button 210 engageable by the operator to release the latch. Spring means (not shown) act upon the lever 202 biasing it toward its latched position.

Air motor 126 is a single acting motor operable to raise the welding tool 120 by its interconnection with plate 128. The air motor 126 is on exhaust in the opposite direction of movement, allowing the tool 120 to fall by gravity carrying a stud toward a workpiece disposed underneath the tool. The motor 126 is actuated to raise the tool 120, and as it reaches the top of its stroke lever 202 engages the tool to retain it in its retracted or "ready" position shown in FIG. 7. The entire welding tool above described is raised with respect to the support 122 and the cam 186, thereby engaging cam 186 between fingers 146 and 148, the cam portion 190 urging the outer ends of the fingers apart, thus also shifting the inner ends thereof apart and out of engagement with the undercut 178 in piston rod portion 158. This frees piston 156 and its rod portions 158 and 160 for movement within cylinder 162.

When the tool 120 reaches the position shown in FIG. 7, air is introduced against the lower face of piston 156 through port 164 and passage 166, retracting the piston, and also plunger or rod portion 160 until it reaches a position spaced from stud inlet 172. A stud is thereupon delivered through conduit 174 and inlet 172 in front of rod 160, and falls by gravity down into collet 92. Cylinder 142 is then reversely pressurized through a port (not shown) at its upper end to extend piston 156 until it abuts the upper end of member 162, at which point the forward end of plunger 160 has transferred the stud S into welding position in collet 92 as shown in FIG. 10. Undercut 178 in rod portion 158 is then disposed in radially aligned confrontation with groove 184 and thus with fingers 146 and 148, which are held spaced therefrom by engagement with cam plate 186. This relationship is shown schematically in FIG. 9. With the stud S loaded into collet 92 and retained in welding position by plunger 160, the tool 120 is ready to weld.

Welding is actuated by the operator depressing button 210 to release lever 202 from the tool 120, allowing the tool to fall by gravity toward a workpiece therebelow, and also delivering welding current to the stud S from a suitable supply source (not shown). As the tool travels downwardly, fingers 146 are disengaged from cam plate 186, and spring 154 urges the fingers together until their inner ends engage undercut 178 in rod portion 150 as shown in FIG. 8, thereby locking the rod and its plunger portion 160 against movement relative to the remaining parts of the welding tool 120. When the stud S strikes the workpiece, the actual welding cycle is identical to that above described with reference to FIGS. 1–6. Upon completion of the weld, motor 126 may again be actuated to retract the tool, and another stud delivered to ready the tool for the next welding operation. It will be obvious to those skilled in the art that an automatically operable mechanism could be substituted for the release mechanism 200 to make the system fully automatic.

The control for controlling the operation of the gravity tool shown in FIGS. 7–10 may be almost identical to the control previously described with respect to the tool of FIGS. 1–6, which control is shown in FIG. 11. Referring to FIG. 11, the switch 1LS is positioned to be closed when the tool is in its up and latched position as shown in FIG. 7, while the switch 2LS is positioned to be closed when piston 156 is in its extended position backing up a stud S positioned in welding position in collet 92 as shown in FIG. 10. Utilizing the controls shown in FIG. 11, the manual latching mechanism 200 of FIG. 7 would be replaced by a solenoid operated latch controlled by solenoid SOL. 2 in FIG. 11; otherwise the control would be similar to that previously described, with its operation as follows.

Energization of 1CR and closure of contacts 1CR–3 to energize solenoid SOL. 1 pressurizes the upper end of the cylinder to urge piston 156 downwardly to seat the stud S in the collet 92. Energization of 3TR as above described and closure of contacts 3TR–3 energizing solenoid SOL. 2 operates the latch 200 to permit the tool to drop by gravity and effect welding of the stud S to the workpiece. An additional solenoid SOL. 4 is provided, shown in phantom outline in FIG. 11, which solenoid is energized by the closure of relay contacts 4TR–4 to pressurize the lower end of fluid pressure motor 126 and raise the tool to its up position as shown in FIG. 7 to ready it for a subsequent welding operation. Otherwise the circuit would function as previously described with reference to FIGS. 1–6 inclusive.

What is claimed is:

1. In a percussive stud welding system including stud supply means for delivering successive studs to a welding tool to be welded to a structural member, a welding tool comprising a body, collet means on the body for holding a stud in welding position, stud delivery passage means in said body establishing communication between said stud supply means and said collet means, reciprocable plunger means shiftable within said delivery passage means to transfer a stud to said collet means and retain it thereat in said welding position, releasable locking means for rigidly locking said plunger against relative motion with respect to said body when in said stud retaining position, and means coupled to said locking means for actuating the same.

2. The invention as defined in claim 1 characterized in that said locking means comprises a transverse undercut on said plunger and at least one rigid member mounted on said body for shiftable movement and having an end portion engageable within said undercut in locking relationship therewith.

3. The invention as defined in claim 2 characterized in that said plunger has an annular undercut, and a pair of finger members are provided which are supported on a common pivot for pivotal movement into engagement with said plunger on opposite sides thereof, each finger having an end portion engageable with the plunger undercut.

4. The invention defined in claim 3 characterized in that said fingers are spring biased to their plunger-engaging position, with means mounted on said welding tool engageable with the fingers to shift the same to a non-engaging position.

5. The invention defined in claim 4 characterized in that said means for shifting the arms comprises a stationary plate positioned to be interposed between the arms, upon movement thereof.

6. The invention defined in claim 5 characterized in that said releasable locking means comprises an air cylinder and piston operably coupled to said plunger for actuation when the plunger is in its stud retaining position to retain the latter against relative movement with respect to said body.

7. In a percussive stud welding system including stud supply means operable to deliver successive studs to a welding tool for welding to a structural member, a welding tool comprising a support, a body mounted on said support for reciprocable movement with respect thereto, collet means at one end of said body for holding a stud in a welding position, a stud delivery passage extending rearwardly from said collet and establishing communication between said stud supply means and the collet, a reciprocable plunger in said body shiftable through said delivery passage to transfer a stud therein into said collet and support the stud during a percussive welding operation, and releasable locking means coupled to said plunger for rigidly locking the plunger stationary with respect to said body during said welding operation.

8. The invention defined in claim 7 characterized in that said welding tool comprises a pair of coaxially aligned, nested pistons, the inner piston defining said reciprocable plunger, and the outer piston defining a cylinder within which the inner piston shifts, and releasable locking means interlocking said two pistons against relative movement therebetween during a welding operation.

9. The invention as defined in claim 8 characterized in that said locking means comprises an undercut portion on said inner piston and at least one locking part on said outer piston engageable with said undercut portion upon movement of the body toward a workpiece during a welding operation.

10. The invention as defined in claim 9 characterized in that said piston undercut comprises an annular groove, and said outer piston has a plurality of radially extending cavities within each of which is disposed a ball member, with means on the tool for urging said ball members into locking engagement with said piston groove upon movement of the tool body to perform a welding operation.

* * * * *